May 13, 1930.  A. A. GLIDDEN ET AL  1,758,438
PROCESS FOR MANUFACTURING MOLDED EXTENSION TOPS AND MOLDED BOOTS
Filed Jan. 8, 1929  2 Sheets-Sheet 1
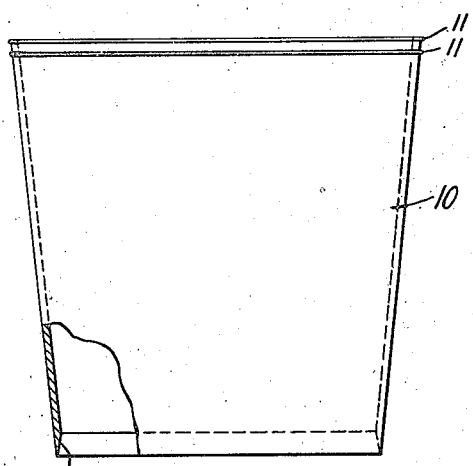
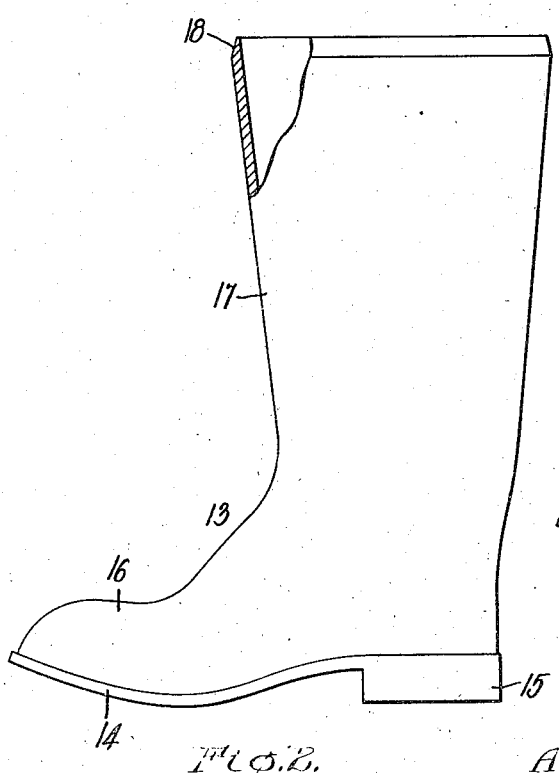
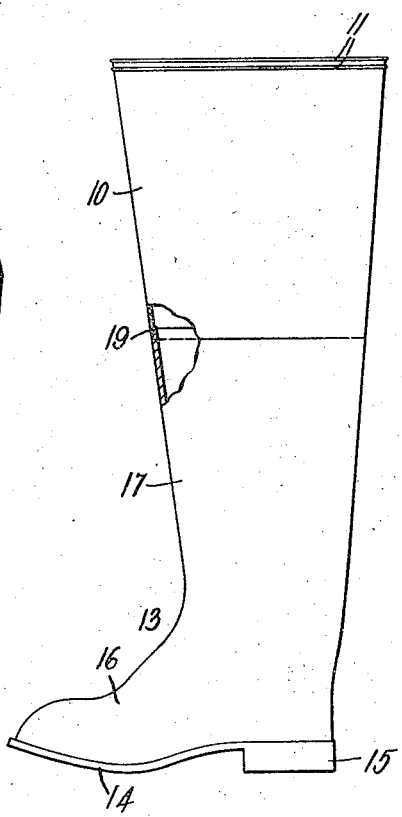
Inventors:
Alfred A. Glidden.
Thomas M. Knowland.
by Charles S. Gooding, Atty.

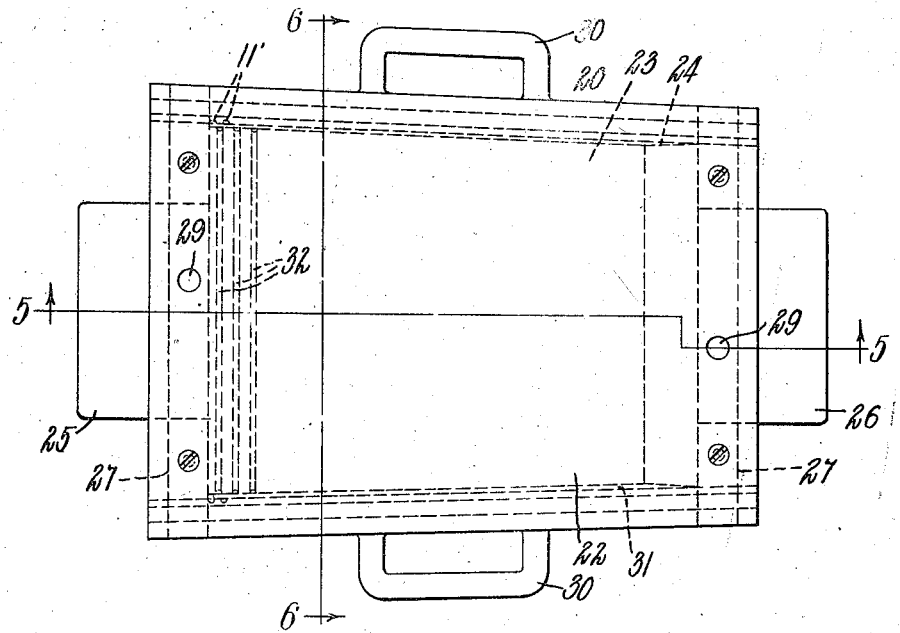
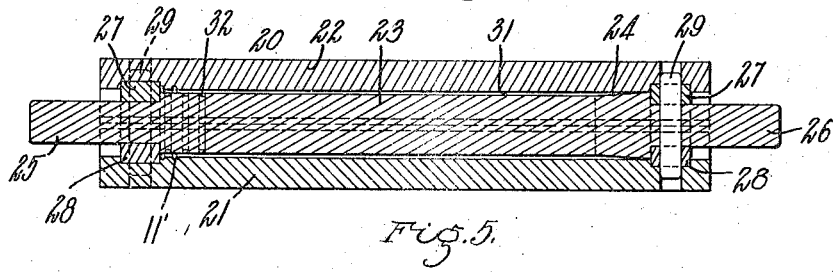
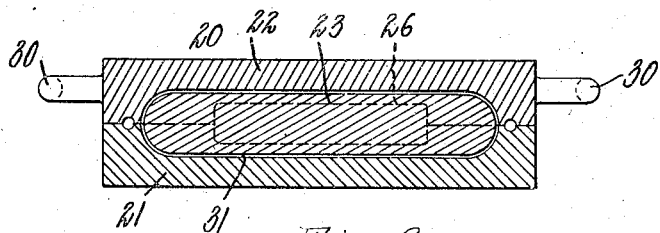
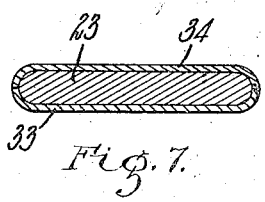
Inventors:
Alfred A. Glidden,
Thomas M. Knowland.
by Charles S. Gooding, Atty.

Patented May 13, 1930

1,758,438

UNITED STATES PATENT OFFICE

ALFRED A. GLIDDEN AND THOMAS M. KNOWLAND, OF WATERTOWN, MASSACHUSETTS, ASSIGNORS, BY MESNE ASSIGNMENTS, TO HOOD RUBBER COMPANY, INC., OF WILMINGTON, DELAWARE, A CORPORATION OF DELAWARE

PROCESS FOR MANUFACTURING MOLDED EXTENSION TOPS AND MOLDED BOOTS

Application filed January 8, 1929. Serial No. 330,983.

This invention relates to an improved process for manufacturing a molded boot with a molded extension top.

The object of the invention is to provide a process for molding and vulcanizing a boot of rubber compound and embodying a foot and leg portion and an extension top molded and vulcanized, the boot and the extension top being molded separately and subsequently spliced together by vulcanizable cement, the spliced portion being finally vulcanized under pressure and heat.

In the present art, extension tops for boots known in the trade as "top boots" are made up of sheets of compounded and uncured rubber applied to friction sheeting in such a manner as to give the required size, shape and thickness to the top and to reinforce it at the parts where the greatest amount of wear is likely to ensue. After being shaped in accordance with a designated construction and pattern, the top is spliced by means of a cement to an uncured short boot and the assembly top boot thus formed is cured in the ordinary boot vulcanizer.

The disadvantage of this procedure is that the top portion is usually of a very much thinner construction than the boot itself, so that there is a tendency to overcure the top, resulting in poor aging and wear as compared with the boot portion, that is, the foot and leg portion.

Furthermore, the cost of calendering, laying out, cutting and assembling the parts is excessive. In addition to this, all boots, except molded boots, are cured in the so-called air cure at atmospheric pressure or the low-pressure cure which seldom exceeds 30 pounds gauge pressure and which results in a comparatively porous stock of relatively low physical properties.

A top constructed and cured in the above manner is likely to be not self-supporting in character, thus necessitating a strap to keep it from sagging or falling down from the thigh of the wearer.

One of the advantages secured by a boot constructed and molded as hereinafter described is that the top can be made of one type of rubber compound and the leg and foot portion and the sole can be formed of another composition including rubber compound and fabric, if so desired. The top portion may be made only of rubber compound material, or a combination of rubber compound material and fabric as may be desired.

By means of the process of this invention a top boot is produced with an extension top which is substantially thicker than the tops for rubber boots hereinbefore made and which top, as stated, will stand up without the aid of a fastening to the belt of the wearer. This type of boot also has the advantage that if a man kneels and his knee engages the molded extension top portion, said top portion will stretch, whereas top boots as hereinbefore manufactured have a lining which stretches very little, if any, and therefore wrinkles very badly, these wrinkles producing early cracking in the top.

By means of the process of this invention the boot has an extension top which is elastic and which may be made with any desired compounds or of any thickness, and which compounds or compositions of the top are preferably made of different compositions of materials than the leg, foot and sole portions of the boot.

Another advantage secured by the process of this invention resides in the fact that by separately molding and vulcanizing the boot and the extension top, the most desirable length of time and degree of heat can be utilized for the boot portion and for the extension top portion respectively. The length of time and the degree of heat employed in manufacturing the boot, in order to properly vulcanize it, especially considering the thickness of the sole of the boot, would be different from the time and degree of heat necessary to properly vulcanize the top, and by separately molding and vulcanizing the boot and the extension top, the best results for the boot and for the extension top are obtained by molding and vulcanizing them separately, whereas when the whole boot, including the extension top, was vulcanized at one operation, these results could not be attained, due to the fact, for example, that the degree of heat and length of time necessary to mold and vulcanize the boot, with its thick sole, were entirely inadepquate for the time and degree of heat required to vulcanize the extension top which for example, might be made of pure rubber compound, in which instance the pure rubber compound extension top when subjected to the degree of heat and for the length of time necessary to vulcanize the boot with its thick sole, would be in some cases rendered plastic to an impracticable extent and thus ruined.

The invention consists in a process for molding a boot and a top for the same as described in the following specification and particularly pointed out in the claims.

Referring to the drawings:

Figure 1 is a side elevation partly broken away and shown in section of the molded extension top produced by the process of this invention.

Fig. 2 is a side elevation partly broken away and shown in section of a molded boot produced by the process of this invention and having a sole, foot and leg portion.

Fig. 3 is a side elevation partly broken away and shown in section of a completed molded vulcanized rubber compound boot with molded extension top produced by the process of this invention.

Fig. 4 is a plan view of a mold partly broken away, whereby the extension top illustrated in Fig. 1 may be molded.

Fig. 5 is a sectional elevation of the same taken on the line 5—5, Fig. 4.

Fig. 6 is a transverse section of the mold taken on the line 6—6, Fig. 4.

Fig. 7 is a transverse section on a reduced scale illustrating one way in which the rubber compound may be placed in the mold to be molded and vulcanized.

Like numerals refer to like parts throughout the several views of the drawings.

In the drawings, 10 is a molded extension top of rubber compound, the upper end of the extension top being provided with annular corrugations 11 and the lower end of the extension top being bevelled at 12.

In Fig. 2, 13 is the molded rubber compound boot consisting of a sole portion 14, a heel 15, a foot portion 16 and a leg portion 17. The leg portion is bevelled at its upper end at 18.

In Fig. 3 the completed boot with extension top is illustrated and consists of the boot portion 13 shown in Fig. 2 and the extension top portion 10 shown in Fig. 1, the two parts being spliced together at 19. The extension top is molded by means of a mold 20, illustrated in Figs. 4, 5 and 6 and consisting of a lower section 21, an upper section 22 and a core 23. The core 23 is bevelled at 24 in order to produce the bevelled lower end 12 of the extension top.

The body portion of the core 23 is suspended between the upper and lower sections 22 and 21 by ends 25 and 26. The core is spaced apart from the upper and lower sections 22 and 21 by bars 27 and 28 and positioned with respect to said upper and lower sections by dowel pins 29 which extend through the ends 25 and 26 and into the lower and upper sections 21 and 22.

The ends 25 and 26 of the core 23 are also used to position the core within the section 21. Handles 30 are provided upon the upper section 22 of the mold in order that the same may be conveniently positioned upon the lower section 21 and core 23. When the core is positioned between the sections 21 and 22 a space 31, of the form which it is desired to impart to the extension top, is provided between it and the sections 21 and 22.

It will be seen that by means of the upper and lower sections 21 and 22 and the core 23 of the mold 20 any desired shape can be imparted to the extension top 10. The mold can be so designed as to impart a thicker section as to certain parts of the top where the wear or stress is greatest, or fabric strips can be so applied as to form an integral part of the molded top. Designs and patterns can be produced on both the inside and outside of the top 10 so as to give special decorative effects to the outside and to prevent the top from slipping down on the thigh of the wearer. In order to produce designs or patterns on the outside of the extension top, such as the annular corrugations 11, corresponding grooves 11' may be made on the inner faces of the upper and lower molds, and to produce corrugations on the inside of the extension top, grooves 32 may be provided upon the core 23.

In manufacturing the extension top 10, a sheet of rubber compound 33 of the desired material and characteristics is placed in the lower section 21 of the mold. The core 23 is then placed in position as illustrated in Fig. 5. Another sheet of rubber compound 34 is then placed upon the core 23 as illustrated in Fig. 7. The upper section 22 of the mold is then placed in position upon the lower section and pressed against the sheet of rubber 34. The mold is then subjected to pressure and heat by a heated press in a manner well known to those skilled in the art and for a suitable length of time to mold and vulcanize the sheets 33 and 34 into an integral article constituting the extension top 10.

The boot 13 comprising the sole 14, heel 15, foot portion 16 and leg portion 17 is then molded and vulcanized preferably as shown and described in United States Letters Patent No. 1,692,828, issued November 27, 1928, and subsequently the upper edge of the boot is trimmed and skived, or buffed off on the outside as shown at 18, Fig. 2. Vulcanizable cement is then applied to the bevelled edges 18 and 12 of the boot and of the extension top. The cement is then allowed to dry for two hours and vulcanizable cement is then applied thereto. The beveled upper edge of the boot and the bevelled lower edge of the top are then spliced together cement to cement as evenly as possible and rolled down thoroughly into contact with each other with a hand roller. The boot thus spliced is vulcanized adjacent to the splice, preferably by the means and process set forth in our application for United States Letters Patent filed November 6, 1928, Serial No. 317,560.

The extension top has been described as having the lower end 12 thereof bevelled by having the core 23 bevelled at 24, but it is evident that if desired, the lower end of the extension top may be bevelled in any suitable manner as by trimming and skiving, or buffing.

We claim:

1. The process of manufacturing a molded boot with extension top which consists in molding a boot of rubber compound and vulcanizing the same and in molding an extension top of rubber compound and vulcanizing the same, then attaching the lower edge of the extension top to the upper edge of the boot leg by vulcanizable adhesive material, and then locally vulcanizing the edges thus attached together.

2. The process of manufacturing a molded boot with extension top which consists in molding and vulcanizing a boot of rubber compound, then trimming the upper edge of the boot leg, then bevelling the said upper edge, and in molding and vulcanizing an extension top of rubber compound and bevelling the lower edge thereof, then attaching the lower edge of the boot top to the upper edge of the boot leg by vulcanizable adhesive material, and then locally vulcanizing the said edges together.

3. A step in the process of manufacturing a rubber compound boot with extension top which consists in attaching the bevelled lower edge of a molded extension top of rubber compound to the bevelled upper edge of a molded boot of rubber compound and locally vulcanizing the said edges together.

4. A step in the process of manufacturing a top boot which consists in attaching the lower edge of a boot top of molded vulcanized rubber compound to the upper edge of the leg of a molded vulcanized boot of rubber compound and locally vulcanizing the said edges together.

In testimony whereof we have hereunto set our hands.

ALFRED A. GLIDDEN.
THOMAS M. KNOWLAND.